(12) United States Patent
Balk et al.

(10) Patent No.: US 8,245,835 B2
(45) Date of Patent: Aug. 21, 2012

(54) SORTING APPARATUS

(75) Inventors: Wouter Balk, Baambrugge (NL); Jozef Walter Maria Hopman, Huizen (NL)

(73) Assignee: Eurosort B.V., Weesp (NL)

( * ) Notice: Subject to any disclaimer, the term of this patent is extended or adjusted under 35 U.S.C. 154(b) by 175 days.

(21) Appl. No.: 12/672,354

(22) PCT Filed: Aug. 11, 2008

(86) PCT No.: PCT/NL2008/050544
§ 371 (c)(1),
(2), (4) Date: Mar. 11, 2010

(87) PCT Pub. No.: WO2009/022908
PCT Pub. Date: Feb. 19, 2009

(65) Prior Publication Data
US 2010/0219049 A1 Sep. 2, 2010

(30) Foreign Application Priority Data

Aug. 10, 2007 (NL) .................................... 2000801

(51) Int. Cl.
*B65G 47/46* (2006.01)
(52) U.S. Cl. .................. 198/370.04; 198/369.3
(58) Field of Classification Search ............ 198/370.04, 198/369.3, 370.01, 370.09
See application file for complete search history.

(56) References Cited

U.S. PATENT DOCUMENTS

| | | | |
|---|---|---|---|
| 4,031,998 A * | 6/1977 | Suzuki et al. ............ 198/370.04 |
| 4,461,378 A * | 7/1984 | Roth ........................ 198/370.04 |
| 5,392,927 A | 2/1995 | Haverkamp Begemann et al. |
| 5,779,026 A | 7/1998 | Hosch et al. |
| 6,015,039 A | 1/2000 | Bonnet |
| 6,827,198 B1 * | 12/2004 | Costanzo ................. 198/370.04 |
| 6,860,377 B2 * | 3/2005 | Brixius et al. ........... 198/370.04 |
| 7,766,151 B2 * | 8/2010 | Schaefer ................. 198/370.04 |

FOREIGN PATENT DOCUMENTS

| | | |
|---|---|---|
| EP | 0056912 | 8/1982 |
| JP | 57117409 | 7/1982 |
| JP | 57-184011 | 11/1982 |
| JP | 57184011 | 11/1982 |
| WO | WO 99/48622 | 9/1999 |
| WO | WO 01/51223 | 7/2001 |

OTHER PUBLICATIONS

Official Search Report of the European Patent Office in counterpart foreign application No. PCT/NL2008/050544 filed Aug. 11, 2008.
Written Opinion of the European Patent Office in counterpart foreign application No. PCT/NL2008/050544 filed Aug. 11, 2008.

* cited by examiner

*Primary Examiner* — Mark A Deuble
(74) *Attorney, Agent, or Firm* — Steven M. Koehler; Westman, Champlin & Kelly, P.A.

(57) ABSTRACT

A sorting apparatus for sorting products comprises an endless conveying element comprising a support surface. The support surface makes an angle with a horizontal plane, at least at the location of the outlets, about an axis parallel to the conveying direction. The sorting apparatus further comprises locking elements arranged one behind the other, as seen in the conveying direction, which move along synchronously with the conveying element and which can be unlocked independently of each other, which locking elements function to hold the products in place on the support surface. Upon activation of a selected unlocking mechanism, a product is moved downwards from the conveying element towards the outlet under the influence of the force of gravity being exerted thereon.

23 Claims, 9 Drawing Sheets

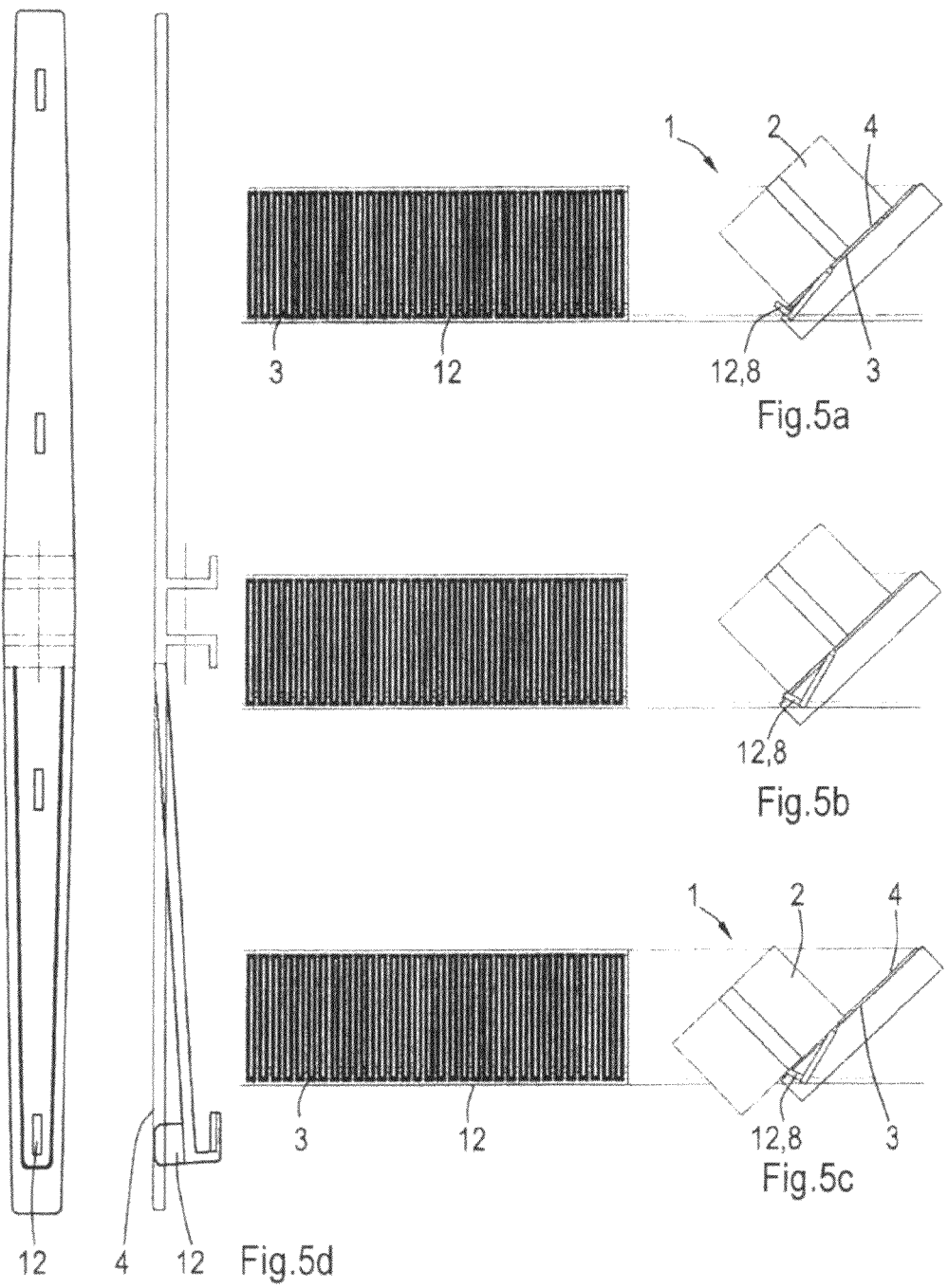

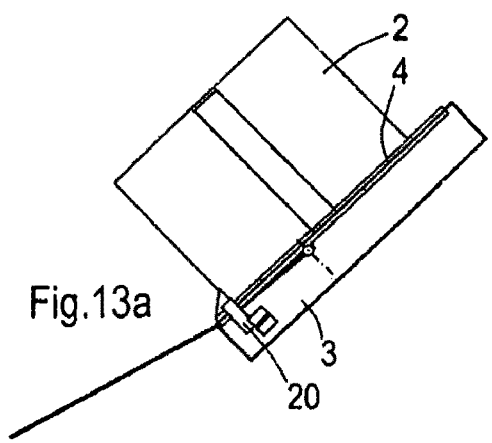
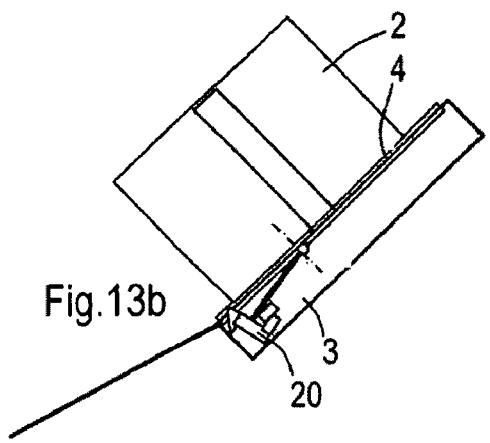
Fig.13a  Fig.13b
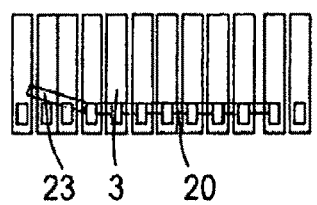
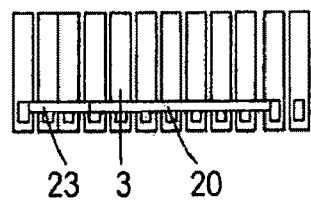
Fig.13c  Fig.13d
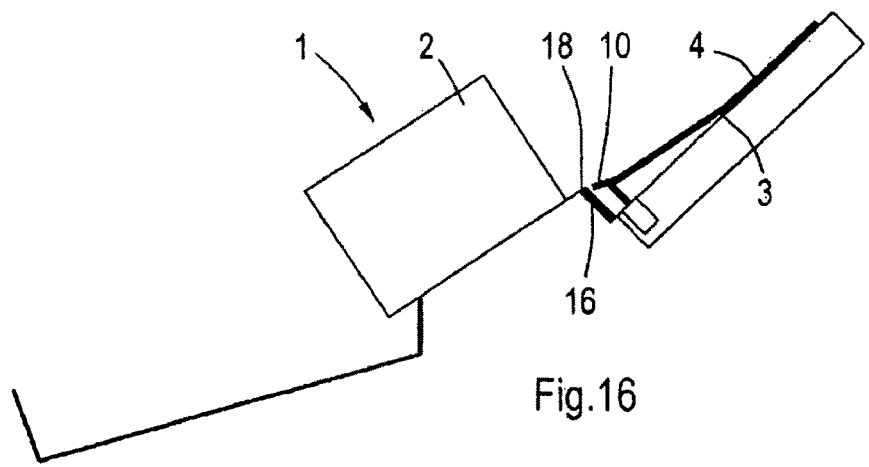
Fig.16

SORTING APPARATUS

CROSS-REFERENCE TO RELATED APPLICATION

The present application is a national stage filing of International patent application Serial No. PCT/NL2008/050544, filed Aug. 11, 2008, and published as WO 2009/022908 in English.

BACKGROUND

The discussion below is merely provided for general background information and is not intended to be used as an aid in determining the scope of the claimed subject matter. Aspects of the invention relates to a sorting apparatus for sorting products according to the preamble of claim 1.

Such an apparatus is known from JP 3042413. The known sorting apparatus comprises a conveyor belt which is tilted about an axis extending parallel to the conveying direction. The products are held in place on the conveyor belt by separate conveyor belts, which are arranged perpendicular to the support surface of the conveyor belt, at the lower longitudinal edge thereof. When a product is to be conveyed to one of the outlets, a conveyor belt cooperating therewith is swung down, so that the product can move off the conveyor belt. The drawback of the known apparatus is that it cannot function optimally when products of varying dimensions are to be conveyed. In addition, the known apparatus is a complex and, because of the separate, driven conveyor belts, costly solution.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A sorting apparatus according to an aspect of the invention includes spacing between two locking elements arranged behind each other that is smaller than the narrowest outlet width of the outlets.

This feature leads to a sorting apparatus in which at least two products of possibly different dimensions being conveyed in succession can each be held in place on the inclined support surface by one or more locking elements, whilst one of said two products can be discharged without the other product landing in the same outlet when the two products pass one outlet. As a result, a sorting apparatus having outlet width dimensions suitable for relatively large products will be capable not only of sorting small products as well but also of doing so at a relatively high speed, because the spacing between two successive products being conveyed may be small.

In practice the various outlets will usually have the same outlet width.

The support surface can be a non-discrete support surface. That is, the support surface in any case does not comprise any sections (such as upright edges) between the inlet and the outlets selected in dependence on predetermined product dimensions, so that the sorting apparatus is suitable for handling products of widely varying dimensions. The support surface may be a flat surface, for example, formed by a belt or slats, for example. The support surface may be an at least substantially continuous or obstacle-free surface, as seen in the conveying direction, between the inlet and the outlets. This means that the support surface is so configured that in principle products can be moved in the conveying direction without impediment over said surface. Although it is not necessary in practice to move products in the conveying direction over the support surface, the flat surface would eliminate the need to lift the products over obstacles in order to move said products from the inlet to the outlets.

In this embodiment the support surface is not formed by (tiltable) discrete containers, therefore, which leads to more freedom in selecting the dimensions and the variations in the dimensions of the products to be conveyed. In the case of discrete support surfaces, for example, the support surface must be larger in practice than the largest of the products to be conveyed. A non-discrete support surface, on the other hand, provides the freedom to select the spacing between products on the support surface at random. The spacing between the products can be freely selected. On the other hand, a non-discrete support surface also provides a possibility of conveying small products with a very small spacing between them.

It is an advantage if the locking elements are connected to the conveying element, because a separate driving mechanism for the locking elements moving synchronously along with the conveying element is not needed in that case.

In a practical and relatively simple embodiment, each locking element comprises an obstacle for blocking any downward movement of the product by means of one or more obstacles, and the unlocking mechanism is provided with an actuator for moving the obstacle or raising part of the support surface to a height level with or above an upper edge of the obstacle, such that the products can move off the conveying element towards an outlet without impediment.

At least a second actuator may be present for moving at least a second obstacle spaced from said obstacle or raising part of the support surface above an upper edge of the second obstacle. In this way a possibility is created to unlock a product in two places, as seen in longitudinal direction, so that in the case of a long product, for example, a front part and a rear part thereof can be unlocked simultaneously from the support surface. This prevents a situation in which a product, which would initially only be unlocked at the front side, is conveyed towards the outlet with its front side facing downwards (the so-called nose diving).

In another realization, the conveying element comprises a slat conveyor belt, wherein the support surface is formed by the upper sides of the slats and the slats are substantially adjacent to each other, as seen in the conveying direction, being interconnected via a driving element, and wherein at least a first slat is provided with the obstacle and at least a second slat located adjacent thereto is flexible, having an obstacle-free upper surface, as seen in a direction perpendicular to the conveying direction, and wherein the actuator can be connected to the second slat and be driven in such a manner that, towards the unlocked condition, it moves the second slat up to a height level with or above the upper edge of the obstacle of the first slat, at least near the obstacle of the first slat. The advantage of this embodiment is its simplicity. The slats that are used may be identical in large part, but a number of slats may be provided with an upwardly projecting block, for example at an end portion thereof. In addition, this embodiment offers great freedom of design, because it is not only possible to provide the obstacles on every other slat, as seen in the conveying direction, but also other variations may be used. Furthermore, not all of the obstacle-free slats must be connectable to the actuator, for example. In the case of lightweight products a smaller number of slats to be raised will suffice.

The conveying element may be movable in transverse direction relative to the conveying direction so as to be able to follow a non-rectilinear path. As a result, the conveying element can also follow bends. This can be readily realised in particular with slat conveyor belts.

In an alternative embodiment, the conveying element also comprises a slat conveyor belt, wherein the support surface is formed by the upper sides of the slats and the slats are substantially adjacent to each other, as seen in the conveying direction, being interconnected via a driving element, but wherein at least a first slat is provided with the obstacle and is flexible, and wherein at least a second slat adjacent thereto has an obstacle-free upper surface, as seen in a direction perpendicular to the conveying direction, and wherein the actuator can be connected to the first slat and be driven in such a manner that it moves the first slat in downward direction towards the unlocked condition, such that the upper edge of the obstacle of the first slat is located level with or below the upper side of the second slat. This embodiment, too, is remarkable for its simplicity, because a slat provided with an obstacle can be moved downwards for the purpose of unlocking the product from the support surface. Several variations as regards the positioning of the obstacles are possible in this embodiment as well.

In another alternative embodiment, the conveying element comprises a slat conveyor belt, wherein the support surface is formed by the upper sides of the slats and the slats are adjacent to each other, as seen in the conveying direction, being interconnected via a driving element, but wherein a number of slats are each provided with an obstacle which is movable with respect to the slats, which obstacle projects above the upper surface of the slats in the locked condition, and wherein the actuator can be driven in such a manner that it moves the obstacles in downward direction towards the unlocked condition, so that the upper edge of the obstacles is level with or below the upper side of the slats. The slats need not be flexible in this case, because the obstacle makes a movement with respect to the slats. It is also possible, however, for the slat to exhibit some degree of flexibility. In a possible embodiment, the slat has a pivoted part attached to a part thereof, which part is provided with an obstacle and which is provided with a hook on the underside, which hook can be pulled downwards by an actuator. In the locked condition, the pivoted part lies in the plane of the non-pivoted part of the slat, and the obstacle projects above the non-pivoted part. Such a slat may be made in one piece, for example by integrating the pivoted part in a single slat by means of an injection-moulding technique.

According to another possibility, a number of locking elements each comprises a resistance mechanism, which is arranged to realise a greater resistance between the product and the support surface in the locked condition than in the unlocked condition.

In a practical realization thereof, the resistance mechanism is provided with freely rotatable rollers, which have an axis of rotation with a component parallel to the conveying direction, which rollers project at least partially above the support surface only in the unlocked condition, or whose upper sides form the support surface, and wherein said rollers can be locked relative to the conveying element in the locked condition. Alternatively, the resistance mechanism may be an anti-skid mechanism, which can be switched between the locked condition and the unlocked condition.

Furthermore, one or more locking elements may comprise a clamping element, which is so arranged that one or more clamping elements clamp down the product on the support surface in the locked condition and release the product in the unlocked condition. This is suitable in particular for products which, in view of their characteristics, can be clamped down on the support surface more easily than be stopped, for example by means of an obstacle. One could think of less dimensionally stable products, for example.

The unlocking mechanism may comprise at least one activable actuator at the location of each outlet as well as unlocking means connected to the conveying element for unlocking the corresponding locking elements, which actuator, in an activated condition thereof, is in engagement with unlocking means moving past the outlet for the purpose of unlocking the corresponding locking elements. In this case the actuators need not move along with the conveying element past all the outlets, therefore.

The outlet may comprise several actuators, which can be activated independently of each other. This makes it possible to unlock locking elements present at the location of an outlet width, at different places within said outlet width. When conveying products which have such a short length, as seen in the conveying direction, that at least two products fit within the outlet width, it becomes possible, for example, to unlock only the locking elements associated with one of said products.

In an advantageous embodiment, a contact surface of the actuator, which is in engagement with the unlocking means in the activated condition, is movable in the conveying direction with respect to the outlet. Said unlocking means may be driven or non-driven rollers or belts, for example, so that the resistance between the actuator and the conveying element is minimised.

The contact surface may also be formed by an endless conveyor belt, which moves along with the conveying element, part of which endless conveyor belt is provided with a thickening. Said thickening may for example be shaped so that the product present on the overlying support surface is gradually raised above the upper edge of an obstacle.

In a special embodiment, the unlocking mechanisms may be provided with unlocking means which are movable with respect to the conveying element for unlocking the locking elements, and a moving element is present, which is so positioned and arranged that it is capable in the operative condition thereof of placing the unlocking means into an engaging position before arriving at a selected outlet, in which engaging position the unlocking means are in engagement with an actuator at the location of the selected outlet for selectively unlocking the locking elements that can be unlocked by the unlocking means. This embodiment has the advantage that a random series of locking elements can be unlocked within the outlet width by selectively placing the locking means into the engaging position.

In a practical realization thereof, the actuator comprises a rod-like element, which extends in the conveying direction under the conveying element, and the unlocking means are positioned under the support surface, being movable in a direction transversely to the conveying direction, wherein the unlocking means are raised by the rod-like element upon passing the selected outlet in the engaging position. The rod-like element may thus have the same length as the outlet width, whilst unlocking may take place for each locking element individually.

An aspect of the invention also relates to a sorting apparatus for sorting products, which comprises an endless conveying element for conveying said products, which can be driven in a conveying direction and which comprises a support surface for supporting the products thereon, which support surface is an at least substantially continuous or obstacle-free surface, as seen in the conveying direction, an inlet for receiving the products on the conveying element, a number of outlets, where, in use, the products move off the conveying element in dependence on the selected outlet, which outlets are oriented at an angle relative to the conveying direction and which have an outlet width at the location of the conveying element which extends in the conveying direction, wherein the support surface makes an angle with a horizontal plane, at least at the location of the outlets, about an axis parallel to the conveying direction, and wherein the sorting apparatus further comprises a locking element moving along synchronously with the conveying element, which functions to hold the products in place on the support surface, and wherein the sorting apparatus further comprises ejection mechanisms for eliminating the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism.

The locking element may comprise a drivable endless conveyor belt, which extends parallel to the conveying element near a lowermost part of the support surface and whose guide rollers are oriented at least substantially perpendicular to the support surface, wherein the ejection mechanism comprises an actuator, which can be connected to the support surface at the location of an outlet, and wherein the actuator can be driven in such a manner and the support surface is flexible to such an extent that the actuator is capable of raising the support surface above the upper edge of the conveyor belt at the location of a selected outlet.

The locking element might also be a roller strip comprising freely rotatable rollers, wherein closely spaced, parallel rollers provide an almost closed surface for stopping products present on the inclined support surface.

In a further embodiment, the support surface may be tiltable about an axis parallel to the conveying direction, wherein the locking elements are provided in such a manner that the products are held in place on the support surface in two tilting directions. The advantage of this is that it is possible to dispose the outlets on two sides of the conveyor.

An aspect of the invention also relates to a sorting apparatus for sorting products, which comprises an endless conveying element for conveying said products which can be driven in a conveying direction, an inlet for receiving the products on the conveying element, a number of outlets, where, in use, the products move off the conveying element in dependence on the selected outlet, which outlets are oriented at an angle relative to the conveying direction and which have an outlet width at the location of the conveying element which extends in the conveying direction, wherein the support surface makes an angle with a horizontal plane, at least at the location of the outlets, about an axis parallel to the conveying direction, and wherein the sorting apparatus further comprises a locking element for holding the products in place on the support surface and ejection mechanisms moving along synchronously with the conveying element for eliminating the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism.

The sorting apparatus can be provided with a frame, with respect to which the conveying element is movable, and the locking element is mounted to the frame. The locking element is for example a smooth wall in that case, along which the products present on the support surface slide upon being conveyed.

The ejection mechanism moving along synchronously with the conveying element may be at least partially made up of the support surface, which is at least partially movable in upward direction relative to the locking element at the location of an outlet. The support surface is the upper surface of a conveyor belt, for example, which can be lifted at the location of an outlet, so that a product present thereon is raised above an upper edge of the locking element and subsequently ejected in downward direction towards the corresponding outlet under the influence of the force of gravity.

An aspect of the invention also relates to a sorting apparatus for sorting products, which comprises a frame, an endless conveying element for conveying said products which can be driven in a conveying direction relative to said frame, which conveying element comprises a support surface for supporting products thereon, an inlet for receiving the products on the conveying element, a number of outlets, where the products move off the conveying element in dependence on the selected outlet in use, which outlets are oriented at an angle relative to the conveying direction, wherein the support surface makes an angle with a horizontal plane, at least at the location of the outlets, about an axis parallel to the conveying direction, and wherein the sorting apparatus further comprises a locking element mounted to the frame for holding the products in place on the support surface and ejection mechanisms for eliminating the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism. In this embodiment the sorting apparatus can be combined with features of the embodiments described in the foregoing, for example that the support surface is formed by a continuous and/or obstacle-free surface.

The support surface may be formed by the upper surface of a flexible conveyor belt, and the ejection mechanism may be formed by an actuator, which can be switched so that it can push the conveyor belt upwards so as to eliminate the difference in height between the upper edge of the locking element and the support surface at the location of the selected outlet. In the situation in which the conveyor belt is an endless conveyor belt, for example, and the locking element is a plate-shaped wall extending along the conveyor belt, the actuator can push against the underside of the conveyor belt at the location of an outlet under operating conditions, as a result of which a product present on the conveyor belt is raised above the upper edge of the wall, so that the product can be discharged via the outlet in question.

BRIEF DESCRIPTION OF THE DRAWINGS

Aspects of the invention will be explained in more detail below with reference to drawings, which very schematically show embodiments of the invention.

FIGS. 5a-5c are views partially corresponding to FIGS. 3a-3c and partial top plan views of another alternative embodiment of the sorting apparatus, and FIG. 5d is a top plan view and side view of a practical realisation thereof, in which a slat comprising a flexible part is shown.

FIGS. 13a-d are top plan views and cross-sectional views of another alternative embodiment of the sorting apparatus.

FIG. 16 is a view corresponding to FIG. 9c of another alternative embodiment of the sorting apparatus.

DETAILED DESCRIPTION OF THE ILLUSTRATIVE EMBODIMENTS

Figure 1:
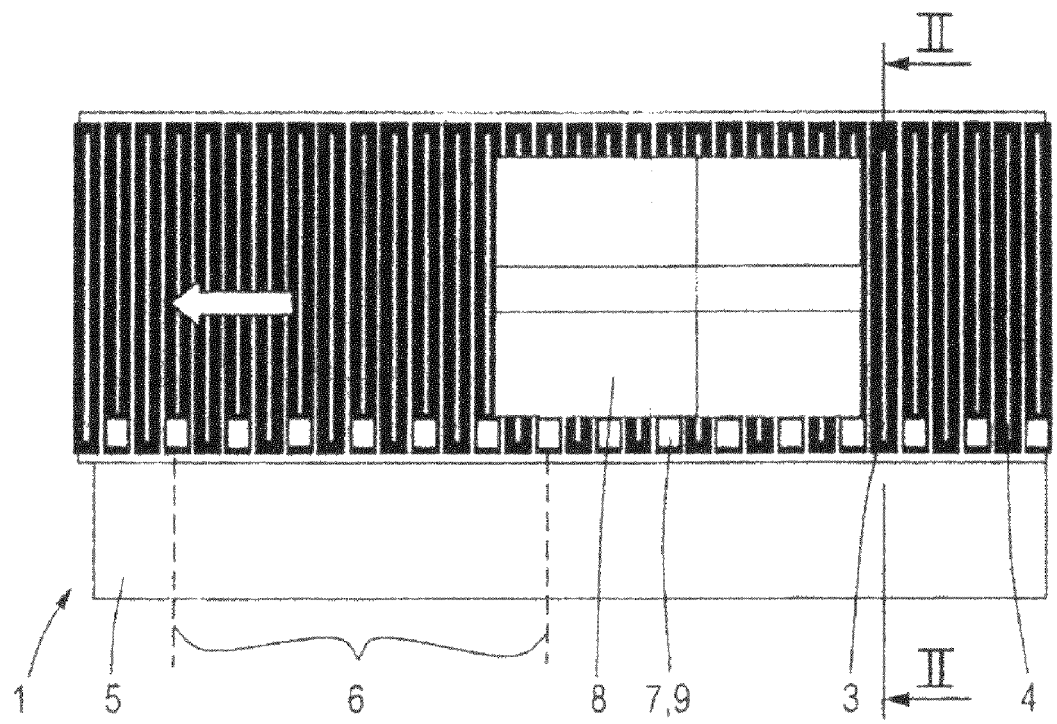
FIG. 1 is a top plan view of an embodiment of a sorting apparatus.
Figure 2:
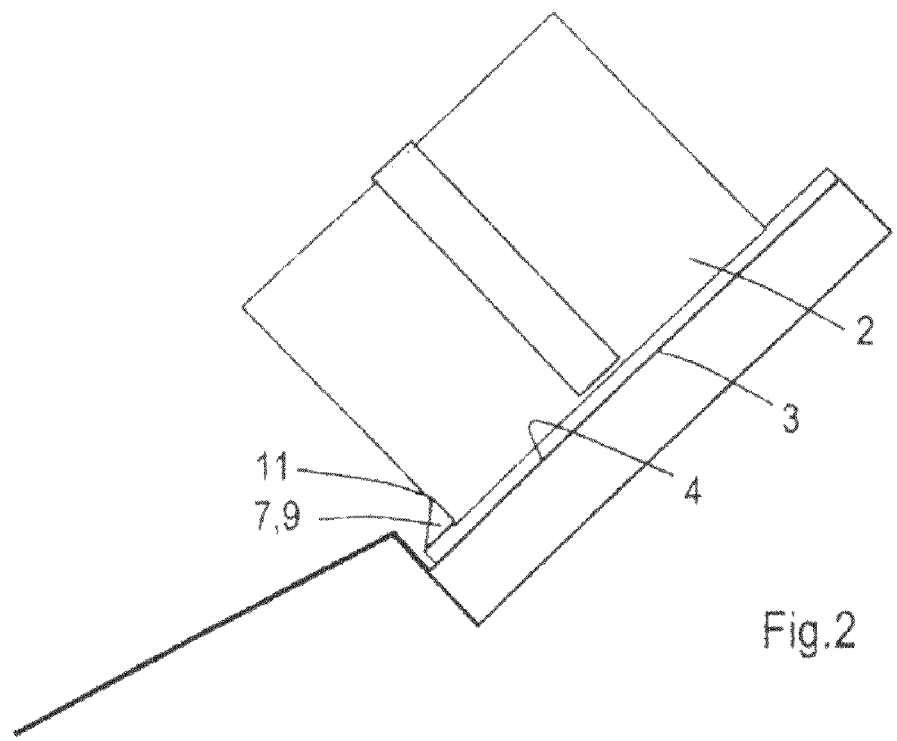
FIG. 2 is a sectional view along the line II-II in FIG. 1.

FIG. 1 shows a top plan view of an embodiment of a sorting apparatus 1 according to an aspect of the invention, and FIG. 2 shows a cross-sectional view thereof. The sorting apparatus 1 is suitable for sorting products 2 and comprises an endless conveying element 3, which can be driven in a conveying direction. The conveying direction is indicated by an arrow in FIG. 1. The conveying element 3 has a support surface 4 for supporting products 2 thereon. In the embodiment shown in FIG. 1, the support surface 4 is a non-discrete support surface 4. This means that the support surface is an at least substantially continuous and/or obstacle-free surface, as seen in the conveying direction. The support surface 4 is not provided with upright edges, for example, which might be spaced apart by a distance selected in dependence on specific products 2. In contrast to conventional apparatuses, in which the support surface 4 is for example formed by trays that can tilt independently of each other, a non-discrete support surface 4 can be used for conveying a large variety of products 2, i.e. products of varying dimensions.

The sorting apparatus 1 further comprises an inlet (not shown) for receiving the products on the support surface 4, as well as a number of outlets 5 where the products move off the conveying element 3 in dependence on the selected outlet 5 in use. In FIG. 1, one outlet 5 is shown by way of example. The outlet 5 is oriented at an angle relative to the conveying direction and has an outlet width 6 at the location of the conveying element 3. The outlet width 6 extends in the conveying direction along the conveying element 3. In practice the outlets 5 will have at least substantially the same outlet width 6, although this is not necessary. The narrowest outlet width 6 determines the dimensions of the largest product 2 that can be sorted by the sorting apparatus 1. The fact is that the outlet width 6 prevents larger products 2 from being conveyed to the outlet 5.

The support surface 4 makes an angle with a horizontal plane about an axis parallel to the conveying direction. This means that the support surface 4 is inclined and that if there would be nothing to stop the products 2, said products would move in downward direction, transversely to the conveying direction, under the influence of the force of gravity. The support surface 4 is inclined at least at the location of the outlets 5, but not necessarily at locations some distance away therefrom. In order to hold the products in place on the support surface 4 of the conveying element 3 during transport, the sorting apparatus 1 is further provided with locking elements 7 moving synchronously along with the conveying element 3. Said locking elements are arranged one behind the other, as seen in the conveying direction. In a locked condition, the locking elements 7 hold the products 2 in place on the support surface 4. This is shown in FIG. 2. The locking elements 7 can be moved to an unlocked position independently of each other by means of unlocking mechanisms 8. Said unlocking mechanisms will be discussed in more detail below.

In the embodiment that is shown in FIGS. 1 and 2, the conveying element 3 comprises a slat conveyor belt, and the support surface is formed by an upper side of the slats. The slats are substantially adjacent to each other, as seen in the conveying direction, and are interconnected via a driving element, such as a chain. In practice the slats may be retained in lateral direction as well as in upward and downward direction near the centre thereof. In this embodiment, every other slat is provided with an obstacle 9 at the location of an end portion on the low side of the slats. The obstacles 9 form the locking elements 7. The obstacle 9 may be a fixed block, for example, which is attached to a slat. The slats present on either side of the slat provided with the obstacle 9 are not provided with an obstacle 9 and, in addition, they are flexible. Incidentally, the slats provided with an obstacle may be flexible as well. Since the obstacles 9 are fixedly connected to the slats, the products 2 placed on the slat conveyor belt are stationary relative to said locking elements 7, so that there will be no wear caused by products sliding over the conveyor belt during transport.

Figures 3A, 3B:
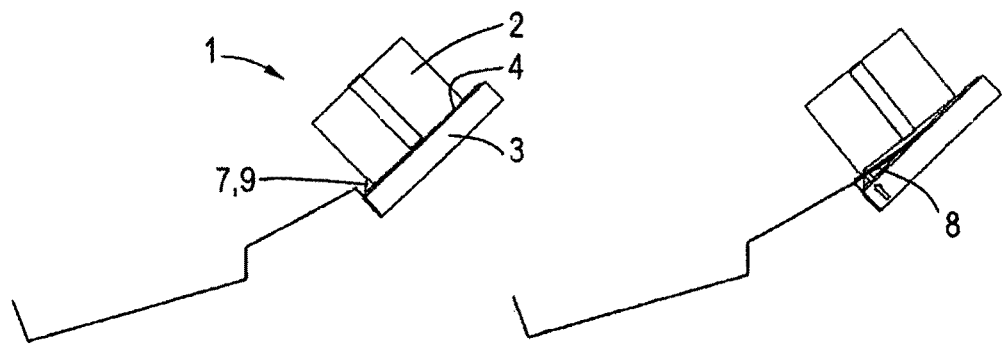
FIGS. 3a-3d are smaller-scale views corresponding to FIG. 2, which show successive steps of the operation of the sorting apparatus.

In the embodiment that is shown in FIGS. 1 and 2, the unlocking mechanism 8 is formed by an actuator 10 (not shown in FIGS. 1 and 2) for raising the slats present on either side of the slat provided with the obstacle 9 above the upper edge 11 of the obstacle 9. This situation is illustrated in FIG. 3b. The obstacle-free slats are to that end provided with a cam on the underside, for example, which can be brought into contact with the actuator.

Figures 3C, 3D:
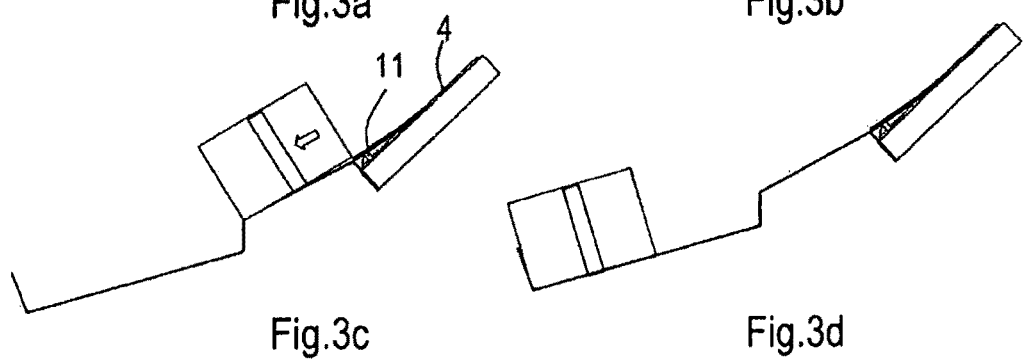

The product 2 shown in FIGS. 1-3 is so dimensioned that it is stopped by a number of locking elements 7. When all the slats which are not provided with an obstacle 9 and which are adjacent to slats which are provided with an obstacle 9 and which are in contact with the product 2 are raised at the bottom side near their end portions, the product 2 can move off the conveying element 3 in downward direction without impediment at the location of an outlet 5 under the influence of the force of gravity exerted thereon. Incidentally, not all the obstacle-free slats near a product 2 need to be activated. In the case of a light-weight product 2, for example, the activation of a lower number of slats than the total number of slats present under the product 2 may suffice. In FIGS. 3c and 3d, the downward movement of the product 2 after it has left the conveying element 3 is shown. After the product 2 has left the conveying element 3, the obstacle-free slats can be returned to their original position.

According to aspect of the invention, the spacing between two successive locking elements 7 is smaller than the narrowest outlet width 6 of the outlets 5. FIG. 1 shows that a number of obstacles 9 located directly behind one another are present within the outlet width 6. The advantage of this arrangement is that the number of obstacle-free slats to be activated can be selected in dependence on the dimensions of the product 2. If small products 2 are to be conveyed and sorted by means of the embodiment of the sorting apparatus 1 according to FIG. 1, it is possible to activate only the obstacle-free slats under one of said products 2, so that each product 2 can be selectively discharged at the location of an outlet 5. The products 2 can be conveyed in close succession in that case without running the risk of two relatively small products 2 disappearing into the same outlet 5.

Figures 4A, 4B:
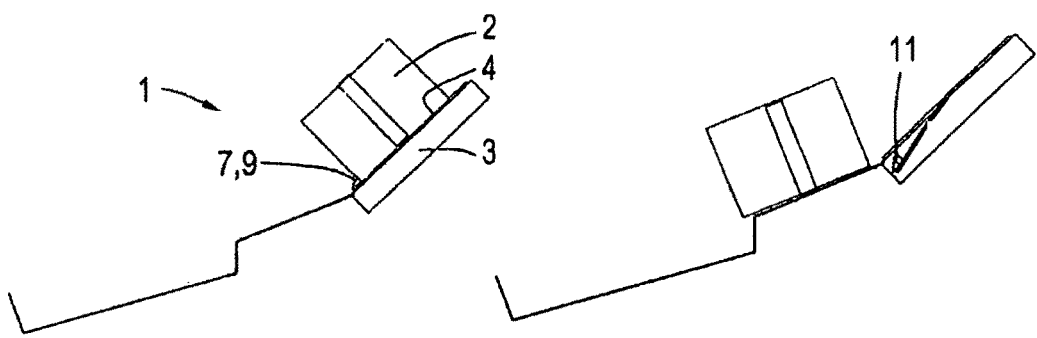
FIGS. 4a and 4b are views corresponding to FIGS. 3a and 3c t of the sorting apparatus.

FIGS. 4a and 4b show an alternative embodiment in which, like in the embodiment described above, every other slat is provided with an obstacle 9. In this case, however, the actuator 10 can be connected to the slats that are provided with an obstacle 9. The actuator 10 can be driven in such a manner that it is capable of moving the slat provided with an obstacle in downward direction towards the unlocked condition. If the slat is moved in such a manner that the upper edge 11 of the obstacle 9 is positioned below the upper side of the obstacle-free slat, the product 2 can move off the support surface 4. This situation is shown in FIG. 4b.

FIGS. 5a-5d show another alternative embodiment of the sorting apparatus 1, in which a number of slats are each provided with an obstacle 12 which is movable with respect to the slats. In the situation shown in FIG. 5a, the movable obstacle 12 takes up an upper position and in this locked condition the obstacle projects above the upper surface of the slats, as seen in relation to the support surface 4. As a result, the movable obstacle 12 holds the product 2 in place on the support surface 4. Not all the slats arranged adjacent to each other need to be provided with such a movable obstacle 12. If each slat is provided with a movable obstacle 12, the locking elements 7 can be spaced closer together than in the situation in which every other slat is provided with an obstacle 9, as is the case in the preceding two embodiments. In this embodiment, the unlocking mechanism 8 is formed by the actuator 10 and the obstacle 12 itself, therefore. The actuator 10 can be driven in such a manner that it moves the movable obstacles 12 in downward direction below the upper edge of the slats towards the unlocked position, see FIGS. 5b and 5c. In this embodiment, the slats themselves need not be moved in the direction perpendicular to the support surface 4, therefore. In a practical realisation of this embodiment, the obstacle 12 may be attached to a flexible and hinged part of the slat, as shown in FIG. 5d. The flexible part of the slat can be pulled down-wards by the actuator 10 via a hook attached to the flexible part. If desired, every slat may be configured in this way with a view to handling small and sensitive products.

Figure 6A:
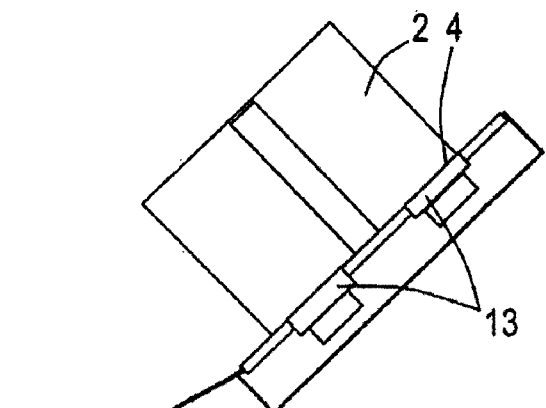
FIGS. 6a and 6b are views corresponding to FIGS. 3a and 3b of another alternative embodiment of the sorting apparatus.
Figure 6B:
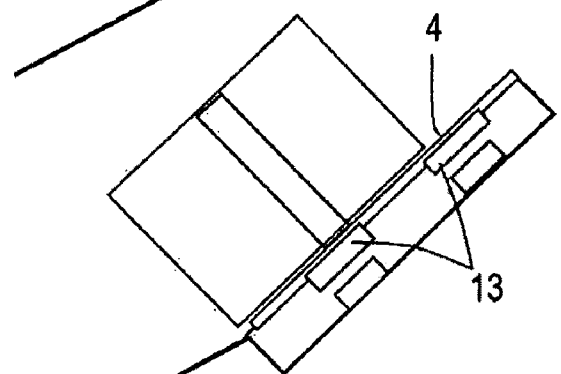

FIGS. 6a and 6b show an alternative embodiment, in which the locking elements are formed by a resistance mechanism 13. The resistance mechanism 13 is designed to effect a greater resistance between the product 2 and the support surface 4 in the locked condition than in the unlocked condition. The resistance mechanism 13 may for example be provided with antiskid units, which are movably provided in the conveying element 3. Said units may for example be movable in a direction perpendicular to the support surface. FIG. 6b shows a situation in which antiskid elements of the resistance mechanism 13 have been moved in downward direction, so that the product 2 can move off the support surface 4, of which the antiskid elements no longer form part in that situation.

Figure 7A:
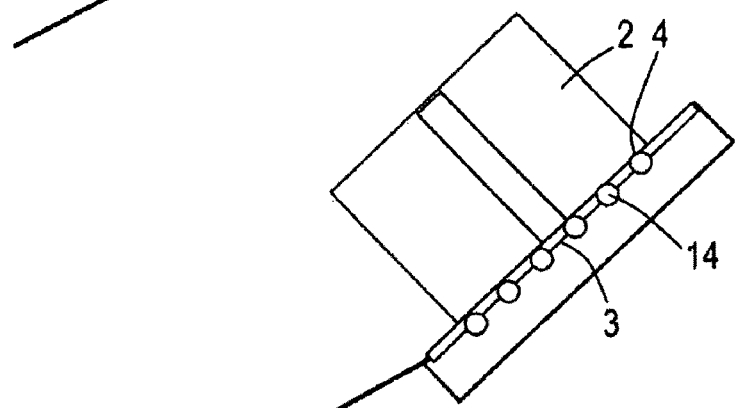
FIGS. 7a and 7b are views corresponding to FIGS. 3a and 3b of another alternative embodiment of the sorting apparatus.
Figure 7B:
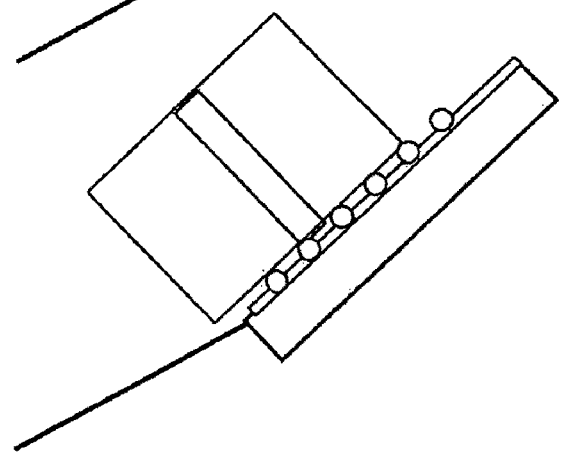

FIGS. 7a and 7b show an alternative embodiment, in which the support surface 4 is formed by the upper sides of freely rotatable rollers 14. In the illustrated embodiment, the rollers 14 have an axis of rotation that extends parallel to the conveying direction, but the axis of rotation may also comprise a component parallel to the conveying direction, so that the axis of rotation may extend at an angle to the conveying direction, for example. In the embodiment shown in FIGS. 7a and 7b, the upper sides of the rollers 14 form the support surface 4, and said upper sides can be locked in position relative to the conveying element 3 in the locked condition. It is also conceivable, however, that the support surface 4 is made up of a conveyor belt, for example, in the locked condition, whilst the freely rotatable rollers 14 are at least partially positioned above the conveyor belt in the unlocked condition, so that the product 2 can be readily conveyed in downward direction, and that with little friction, via the rollers 14.

Figure 8A:
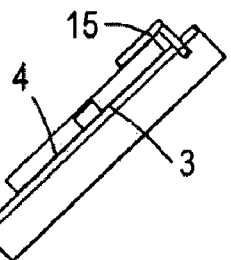
FIGS. 8a and 8b are views corresponding to FIGS. 3a and 3b of another alternative embodiment of the sorting apparatus.
Figure 8B:
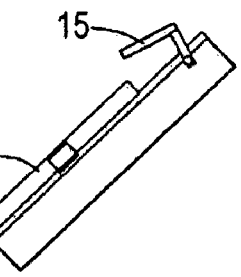

Yet another alternative embodiment is shown in FIGS. 8a and 8b. In this case one or more locking elements 7 comprise a clamping element 15. In FIG. 8 the clamping element 15 is a hook-shaped element, but numerous variations are possible. The clamping elements 15 may be movably attached to the slats of a slat conveyor belt. In the locked condition, the product 2 is clamped down on the support surface 4 by the clamping element 15, and in the unlocked position the product is released, so that it can move off the support surface 4 in downward direction under the influence of the force of gravity exerted thereon.

Figure 9A:
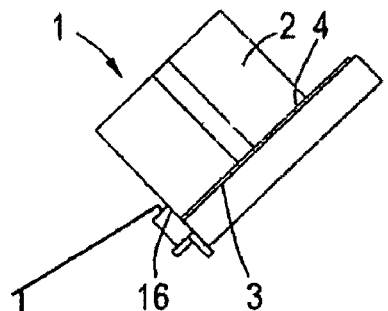
FIGS. 9a-9c are views corresponding to FIGS. 3a-3c of another alternative embodiment of the sorting apparatus.
Figure 9B:
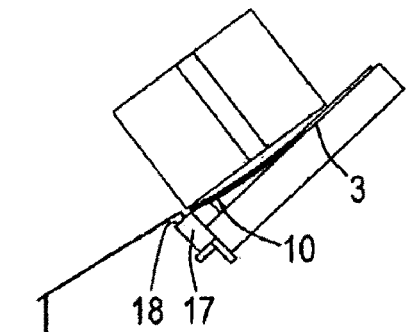
Figure 9C:
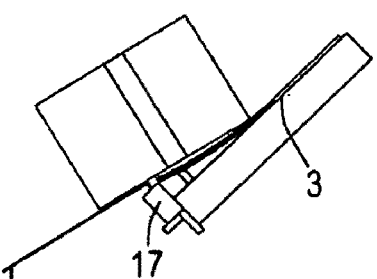

FIGS. 9a-9c show another alternative embodiment, in which the sorting apparatus 1 is provided with a drivable, endless locking element in the form of a conveyor belt 16, which moves along synchronously with the conveying element 3. The conveyor belt 16 is positioned near a lowermost part of the support surface 4 and extends parallel to the conveying direction. The conveyor belt 16 comprises guide rollers 17, which are oriented at least substantially perpendicular to the support surface 4 of the conveying element 3. The products 2 are held in place on the support surface 4 by the conveyor belt 16 while being conveyed towards the outlets 5. The sorting apparatus 1 is further provided with ejection mechanisms in the form of actuators 10. The actuator 10 can be connected to the support surface 4, which is flexible in this case, at the location of an outlet 5. The actuator 10 can furthermore be driven in such a manner that the actuator 10 can raise the support surface 4 above an upper edge 18 of the conveyor belt 16. The difference in height between an upper edge 18 of the locking element 16 and the support surface 4 at the location of the selected outlet 5 is thus bridged, so that the product 2 can move off the support surface 4 in downward direction. It is noted that it is not necessary to use a slat conveyor belt in this case; also other types of flexible conveying elements 3 may be used.

Figures 10A, 10B, 10C, 10D:
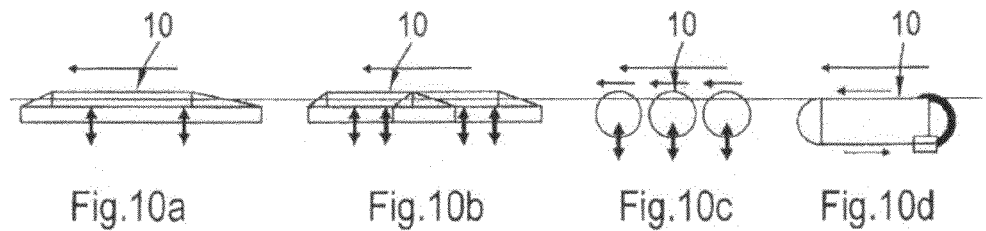
FIGS. 10a-d are side views of various embodiments of actuators of the sorting apparatus according to the invention.

As regards the unlocking mechanisms 8, several embodiments thereof are conceivable. FIGS. 10a-10d show a few different embodiments of actuators 10, which can press against unlocking means or cams attached to the underside of slats, for example, so as to raise product 2 above the upper edge 11 of an obstacle 9, as described with reference to FIGS. 3a-3d. When the actuator 10 is moved to an uppermost position, the cams will come into contact with the actuator 10 upon passing the actuator 10. In practice, an actuator 10 will usually be present at every outlet. FIG. 10a shows a simple embodiment, in which the actuator 10 is an elongated bar. The ends of the bar, which are bevelled at the upper side, ensure that the support surface 4 is raised gradually upon passing the fixedly disposed actuator 10 when said actuator takes up an upwardly oriented position. FIG. 10*b* shows an actuator 10 consisting of two separately drivable parts. The front (upstream) part may be activated first, for example, then both parts may be activated and finally only the rear part. This creates a possibility of conveying the products 2 in rapid succession without having to wait until the actuator 10 has been completely moved to its lowermost position again. The fact is that this is the case when one relatively long rod is used as the actuator 10. FIG. 10*c* shows an actuator 10 which comprises a number of rollers, and FIG. 10*d* shows an actuator 10 which comprises a rotatable belt. In both cases the surface of the actuator 10 that comes into contact with the underside of the support surface 4 moves along with the support surface 4, so that the friction between the conveying element 3 and the actuator 10 is minimised.

Figure 11:
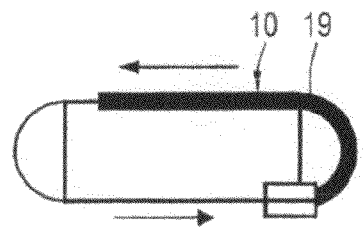
FIG. 11 is a view corresponding to FIG. 10 of another alternative embodiment of an actuator.

In one embodiment, the actuator 10 moves along with the support surface 4 under a product 2, and during this movement the locking element 7 is unlocked. FIG. 11 shows an example of this, in which an actuator 10 comprises a movable belt, which is provided with a thickening 19. In this case the actuator 10 does not move in the direction of the underside of the support surface 4, but the thickening 19 moves along with the product 2 and pushes the support surface 4 upward. In fact, the thickening 19 forms a kind of wave moving along with the conveying element 3 under the product 2.

Figure 12:
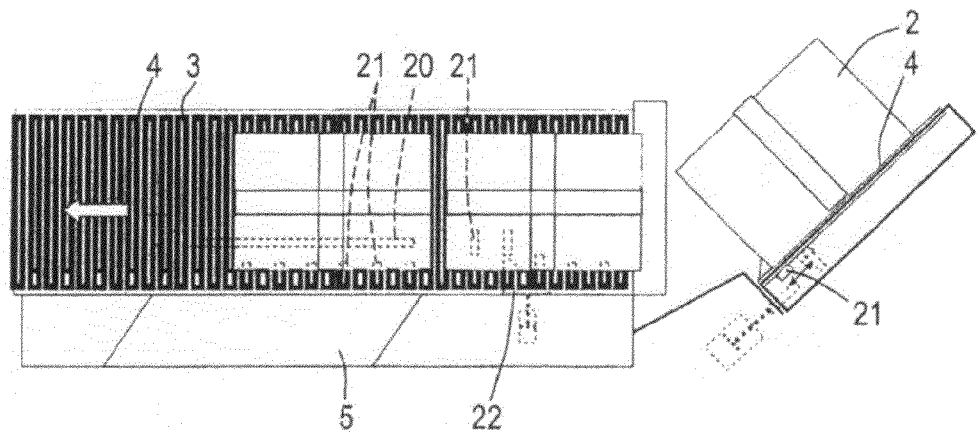
FIG. 12 is a top plan view and cross-sectional view of an alternative embodiment of the sorting apparatus.

Another possibility is shown in FIG. 12. In this case a rod-like element 20 extends in the conveying direction under the conveying element 3. The support surface 4 is furthermore provided with unlocking means 21 at the underside thereof, which are movable in a direction transversely to the conveying direction. In the embodiment that is shown in FIG. 12, the unlocking means 21 are slidably provided under a number of slats, perpendicularly to the conveying direction, in the plane parallel to the support surface 4. Furthermore, moving means 22 are provided, by which the unlocking means 21 can be moved to an activated or engaging position. By activating the unlocking means 21 before a selected outlet 5 is reached, an engagement between the unlocking means 21 and the rod-like element 20 will be effected at the location of the selected outlet 5. The support surface 4 will be raised at the location of the unlocking means 21 upon coming into engagement with the rod-like elements 20.

Furthermore an embodiment is conceivable in which the rod-like element 20 is configured to releasably engage an obstacle which is movable relative to the support surface 4, as shown in FIGS. 13*a* and 13*b*. FIG. 13*a* shows the locked situation and FIG. 13*b* shows the unlocked situation, in which the movable obstacle is moved downwards as a result of coming into engagement with the rod-like element 20, so that the product 2 can move off the support surface 4. A movable finger 23 selectively moves the rod-like element 20 into contact with the movable obstacle. FIG. 13*c* shows the position of the finger 23 in the locked situation, in which the product 2 is held in place on the conveying element 3. FIG. 13*d* shows the unlocked situation, in which the movable obstacle is moved into contact with the rod-like element 20 by the finger 23. This embodiment of locking mechanism 8 can be combined with the embodiments that have been described with reference to FIGS. 4 and 5.

In yet another alternative embodiment, the outlet 5 is provided with two or more unlocking mechanisms 8 (not shown) over the outlet width 6 thereof, which unlocking mechanisms are arranged one behind the other, as seen in the conveying direction. A practical realization thereof is one in which the locking elements 7 are unlocked simultaneously at minimally two spaced-apart places along a product 2, as seen in the conveying direction, resulting in some kind of wave of unlocking actions at minimally two locations along the product 2. In this way the first, most upstream part of the product 2 is prevented from being released first, which would result in the product 2 exhibiting a tendency to move downwards with its front side.

Figure 14A:
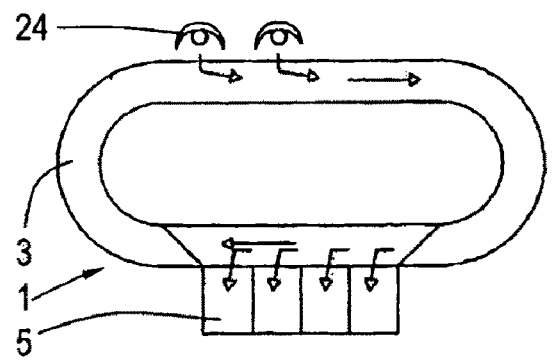
FIGS. 14a-c are top plan views of a possible embodiment of a sorting apparatus, in which circulating paths are shown.
Figure 14B:
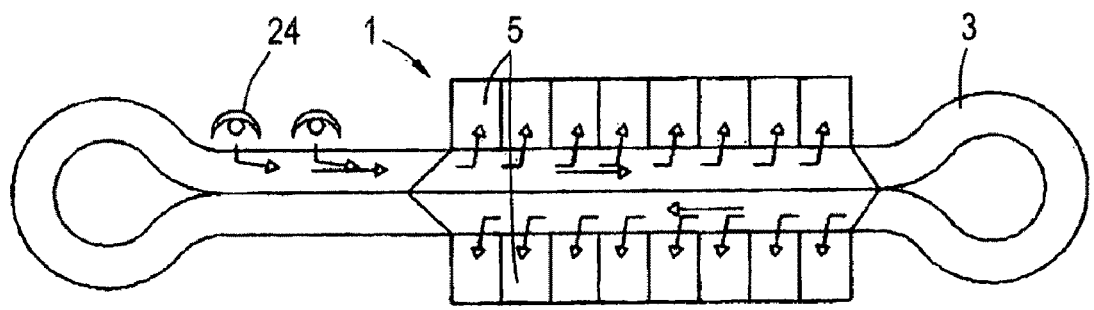
Figure 14C:
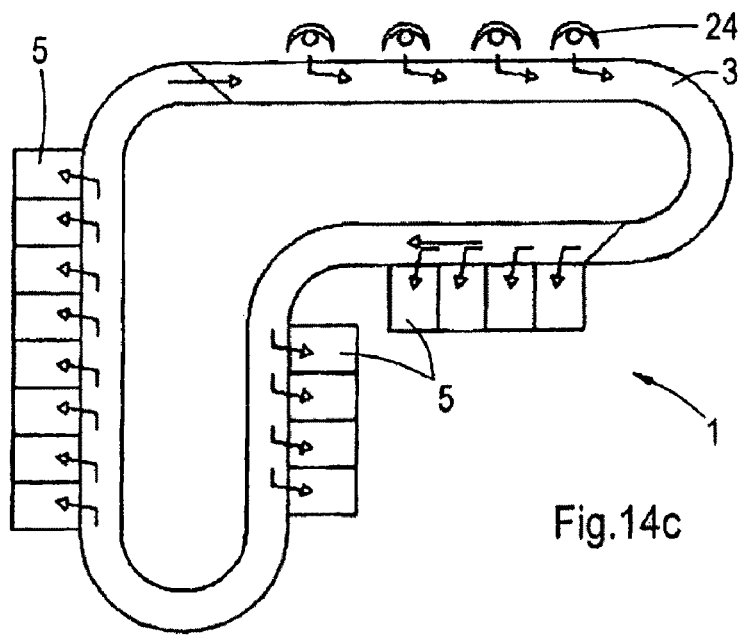

FIGS. 14*a*-14*c* are top plan views of a few possible path configurations of a sorting apparatus 1. The path configuration shown in FIG. 14*a* comprises four outlets 5 and two inlets 24, and the conveying element 3 has an oval configuration. The path configurations shown in FIGS. 14*b* and 14*c* comprise a larger number of outlets 5. A circulating conveyor, as shown in FIGS. 14*a*-*c*, has the advantage that products 2 not sorted out during the first round can be ejected during a next round. Although two-dimensional images are shown here, a three-dimensional configuration is also conceivable. The sorting apparatus 1 may extend over several floors or buildings.

Figure 15A:
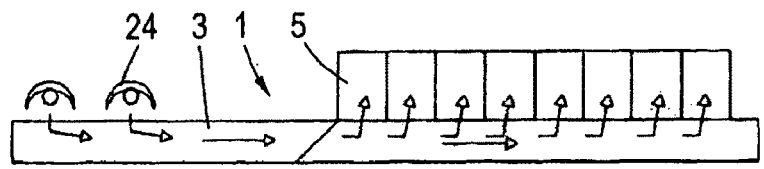
FIGS. 15a-c are views corresponding to FIGS. 14a-c, in which rectilinear paths are shown.
Figure 15B:
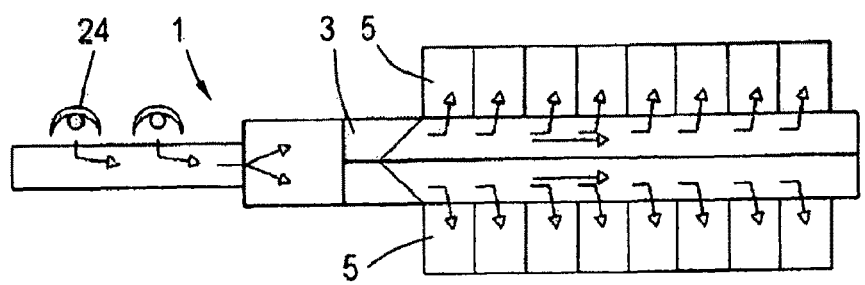
Figure 15C:
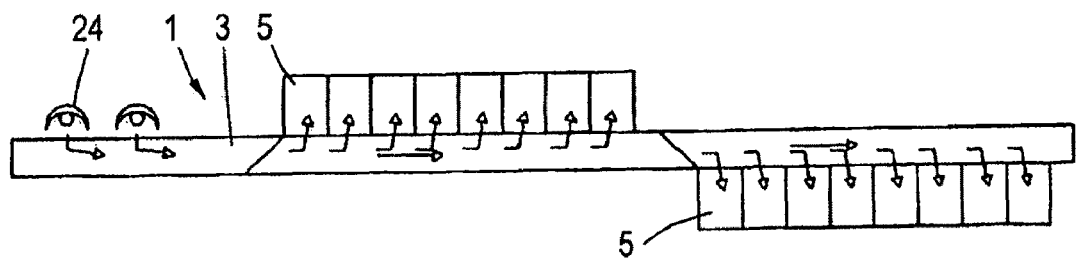

In a path configuration of a different type, the conveyor follows a rectilinear path and the conveying element 3 returns via a parallel path, for instance below the product-carrying part, see FIGS. 15*a*-*c*. In a conveying track that does not comprise any bends, the conveying element 3 need not exhibit any lateral flexibility, which makes it possible to use a simpler type of conveying element 3. The conveying element 3 may have a denser belt structure, for example, making it possible to convey relatively small products 2. FIG. 15*b* shows an embodiment in which the sorting apparatus 1 splits up into two parallel paths. The angles at which the support surfaces 4 of the respective paths are oriented are of opposite sense. In the embodiment shown in FIG. 15*c*, the support surface 4 of the conveying element 3 tilts about an axis parallel to the conveying direction as it travels ahead. This means that the locking elements 7 must be provided in such a manner that the products 2 are held in place in two opposite directions on the support surface 4. In some embodiments, for example in the embodiment in which the obstacles 9 are attached to slats, the locking elements 7 must be of dual construction in this case. For example, a slat may be provided with a block at both ends on the side that forms the support surface 4.

FIG. 16 shows another alternative embodiment of the sorting apparatus 1. The locking element 16 comprises a plate-shaped wall that is fixedly connected to a frame of the sorting apparatus 1, with respect to which frame the conveying element 3 is movable, which plate-shaped wall extends in the conveying direction along the conveying element 3. When products 2 are being conveyed, said products 2 slide along the wall in the direction of the outlet 5. The support surface 4 of the conveying element 3 can be lifted by an actuator near the wall at the location of an outlet 5, so that the product 2 is raised above the upper edge 18 of the wall. As a result, the product will be discharged under the influence of the force of gravity. In this embodiment, the ejection mechanism therefore comprises the movable support surface 4, which moves in the conveying direction, and an actuator, which moves the support surface in a direction perpendicular to the support surface. In this embodiment, the support surface may also be made up of flexible slats, for example.

From the foregoing it will be apparent that the sorting apparatus according to the invention provides a relatively simple yet flexible apparatus for sorting products.

The invention is not restricted to the embodiments as described above and shown in the drawings, which can be varied in several ways without departing from the scope of the invention. It is for example possible to combine features of different embodiments. Furthermore, many variations are conceivable regarding the positioning of the locking elements and the unlocking mechanisms relative to the conveying element.

The invention claimed is:

1. A sorting apparatus for sorting products, which comprises an endless conveying element configured to convey said products in a conveying direction and that comprises a support surface configured to support the products thereon, an inlet configured to receive the products on the support surface, a number of outlets, where, in use, the products move off the conveying element in dependence on the selected outlet, which outlets are oriented at an angle relative to the conveying direction and which have an outlet width at the location of the conveying element which extends in the conveying direction, wherein the support surface makes an angle with a horizontal plane, at least at the location of the outlets, about an axis parallel to the conveying direction, and wherein the sorting apparatus further comprises locking elements arranged one behind the other, as seen in the conveying direction, which move along synchronously with the conveying element and are configured to hold the products in place on the support surface in a locked condition, which locking elements are independently unlocked to an unlocked condition by unlocking mechanisms, so that a product being held in place is unlocked from the support surface upon activation of a selected unlocking mechanism so as to have the product move downwards from the conveying element towards the outlet under the influence of the force of gravity being exerted thereon, wherein the spacing between two locking elements arranged directly behind each other is smaller than the narrowest outlet width of the outlets.

2. The sorting apparatus according to claim 1, wherein the support surface is an at least substantially continuous or obstacle-free surface, as seen in the conveying direction.

3. The sorting apparatus according to claim 1, wherein the locking elements are connected to the conveying element.

4. The sorting apparatus according to claim 1, wherein each locking element comprises an obstacle configured to block any downward movement of the product, and wherein the unlocking mechanism is provided with at least one actuator configured to move the obstacle or raise part of the support surface to a height level with or above an upper edge of the obstacle, such that the product can move off the conveying element towards an outlet without impediment.

5. The sorting apparatus according to claim 4, wherein the conveying element comprises a slat conveyor belt, wherein the support surface is formed by upper sides of the slats and the slats are substantially adjacent to each other, as seen in the conveying direction, being interconnected via a driving element, and wherein at least a first slat is provided with the obstacle and at least a second slat located adjacent thereto is flexible, having an obstacle-free upper surface, as seen in a direction perpendicular to the conveying direction, and wherein the actuator is connected to the second slat and is configured to be driven in such a manner that the actuator moves the second slat up to a height level with or above the upper edge of the obstacle of the first slat, at least near the obstacle of the first slat, towards the unlocked position.

6. The sorting apparatus according to claim 4, wherein the conveying element comprises a slat conveyor belt, wherein the support surface is formed by the upper sides of the slats and the slats are substantially adjacent to each other, as seen in the conveying direction, being interconnected via a driving element, wherein at least a first slat is provided with the obstacle and is flexible, and wherein at least a second slat adjacent thereto has an obstacle-free upper surface, as seen in a direction perpendicular to the conveying direction, and wherein the actuator is connected to the first slat and configured to be driven in such a manner that it moves the first slat in a downward direction towards the unlocked condition, such that the upper edge of the obstacle of the first slat is located level with or below the upper side of the second slat.

7. The sorting apparatus according to claim 4, wherein the conveying element comprises a slat conveyor belt, wherein the support surface is formed by the upper sides of the slats and the slats are substantially adjacent to each other, as seen in the conveying direction, being interconnected via a driving element, and wherein a number of slats are each provided with an obstacle which is movable with respect to the slats, which obstacle projects above the upper surface of the slats in the locked condition, and wherein the actuator is configured to be driven in such a manner that it moves the obstacles in a downward direction towards the unlocked condition, so that the upper edge of the obstacles is level with or below the upper edge of the slats.

8. The sorting apparatus according to claim 1, wherein at least a number of locking elements each comprise a resistance mechanism, which is arranged to realise a greater resistance between the product and the support surface in the locked condition than in the unlocked condition.

9. The sorting apparatus according to claim 8, wherein the resistance mechanism is provided with freely rotatable rollers, which have an axis of rotation with a component parallel to the conveying direction, which rollers project at least partially above the support surface only in the unlocked condition, or whose upper sides form the support surface, and wherein said rollers are locked relative to the conveying element in the locked condition.

10. The sorting apparatus according to claim 1, wherein one or more locking elements comprise a clamping element, which is so arranged that one or more clamping elements clamp down the product on the support surface in the locked condition and release the product in the unlocked condition.

11. The sorting apparatus according to claim 1, wherein the unlocking mechanism comprises at least one activatable actuator at the location of each outlet as well as cams connected to the conveying element and configured to unlock the corresponding locking elements, which actuator is in engagement in an activated condition thereof with the cams moving past the outlet.

12. The sorting apparatus according to claim 11, wherein the outlet comprises several actuators, which are activated independently of each other.

13. The sorting apparatus according to claim 11, wherein a contact surface of the actuator, which is in engagement with the cam in the activated condition, is movable in the conveying direction with respect to the outlet.

14. The sorting apparatus according to claim 13, wherein the contact surface is formed by an endless conveyor belt, which moves along with the conveying element, part of which endless conveyor belt is provided with a thickening.

15. The sorting apparatus according to claim 1, wherein the unlocking mechanisms are provided with cam which are movable with respect to the conveying element and configured to unlock the locking elements, and wherein a moving element is present, which is so positioned and arranged that it is capable in the operative condition of placing a cam is into an engaging position before arriving at a selected outlet, in which engaging position the cam is in engagement with an actuator at the location of the selected outlet and configured to selectively unlock the locking elements.

16. The sorting apparatus according to claim 15, wherein the actuator comprises a rod-like element, which extends in the conveying direction under the conveying element, and wherein the cams are positioned under the support surface, being configured to move in a direction transversely to the conveying direction, wherein a cam is are raised by the rod-like element upon passing the selected outlet in the engaging position.

17. A sorting apparatus for sorting products, which comprises an endless conveying element configured to convey said products in a conveying direction and that comprises a support surface configured to support the products thereon, which support surface is an at least substantially continuous or obstacle-free surface, as seen in the conveying direction, an inlet configured to receive the products on the conveying element, a number of outlets, where, in use, the products move off the conveying element in dependence on the selected outlet, which outlets are oriented at an angle relative to the conveying direction and which have an outlet width at the location of the conveying element which extends in the conveying direction, wherein the support surface makes an angle with a horizontal plane, at least at the location of the outlets, about an axis parallel to the conveying direction, and wherein the sorting apparatus further comprises a locking element moving along synchronously with the conveying element, which is configured to hold the products in place on the support surface, and wherein the sorting apparatus further comprises ejection mechanisms configured to eliminate the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism.

18. The sorting apparatus according to claim 17, wherein the locking element comprises a drivable endless conveyor belt, which extends parallel to the conveying element near a lowermost part of the support surface and whose guide rollers are oriented at least substantially perpendicular to the support surface, and wherein the ejection mechanism comprises an actuator connected to the support surface at the location of an outlet, and wherein the actuator is driven in such a manner and the support surface is flexible to such an extent that the actuator is configured to raise the support surface above the upper edge of the conveyor belt at the location of a selected outlet.

19. The sorting apparatus according to claim 17, wherein the support surface is tiltable about an axis parallel to the conveying direction, and wherein the locking elements are provided in such a manner that the products are held in place on the support surface in two tilting directions.

20. The sorting apparatus according to claim 17, wherein the conveying element is movable in a transverse direction relative to the conveying direction so as to be able to follow a non-rectilinear path.

21. A sorting apparatus for sorting products, which comprises an endless conveying element configured to convey said products in a conveying direction, an inlet configured to receive the products on the conveying element, a number of outlets, where the products move off the conveying element in dependence on the selected outlet in use, which outlets are oriented at an angle relative to the conveying direction and which have an outlet width at the location of the conveying element which extends in the conveying direction, wherein the support surface makes an angle with a horizontal plane, at least at the location of the outlets, about an axis parallel to the conveying direction, and wherein the sorting apparatus further comprises a locking element configured to hold the products in place on the support surface and ejection mechanisms moving along synchronously with the conveying element and configured to eliminate the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism, wherein the sorting apparatus comprises a frame, with respect to which the conveying element movable, and the locking element is mounted to said frame.

22. The sorting apparatus according to claim 21, wherein the ejection mechanism moving along synchronously with the conveying element is at least partially made up of the support surface, which is at least partially movable in upward direction relative to the locking element at the location of an outlet.

23. A sorting apparatus for sorting products, which comprises a frame, an endless conveying element configured to convey said products in a conveying direction relative to said frame, which conveying element comprises a support surface configured to support products thereon, an inlet configured to receive the products on the conveying element, a number of outlets, where, in use, the products move off the conveying element in dependence on the selected outlet, which outlets are oriented at an angle relative to the conveying direction, wherein the support surface makes an angle with a horizontal plane, at least at the location of the outlets, about an axis parallel to the conveying direction, and wherein the sorting apparatus further comprises a locking element mounted to the frame and configured to hold the products in place on the support surface and ejection mechanisms configured to eliminate the difference in height between an upper edge of the locking element and the support surface at the location of the selected outlet, so that a product being held in place will move downwards from the conveying element towards a corresponding outlet at the location of said outlet under the influence of the force of gravity being exerted thereon upon activation of a selected ejection mechanism, wherein the support surface is formed by an upper surface of a flexible conveyor belt, and wherein the ejection mechanism comprises an actuator configured to push the conveyor belt upwards so as to eliminate the difference in height between the upper edge of the locking element and the support surface at the location of the selected outlet.

* * * * *